United States Patent [19]

Keyzer

[11] 4,129,001

[45] Dec. 12, 1978

[54] ENGINE AIR HEATER AND STARTING CIRCUITS TO BY-PASS AUXILIARY STEERING CIRCUIT

[75] Inventor: Carl A. Keyzer, Mundelein, Ill.

[73] Assignee: Fiat-Allis Construction Machinery, Inc., Deerfield, Ill.

[21] Appl. No.: 854,808

[22] Filed: Nov. 25, 1977

[51] Int. Cl.² .................... F15B 20/00; F15B 21/08
[52] U.S. Cl. ........................................ 60/403; 60/404; 60/DIG. 2; 180/133; 123/122 D
[58] Field of Search ............... 60/327, 328, 329, 403, 60/404, 405, 428, 429, 430, DIG. 2; 123/122 D, 179 H; 180/133

[56] References Cited

U.S. PATENT DOCUMENTS

| | | | |
|---|---|---|---|
| 3,434,282 | 3/1969 | Shelhart | 60/405 |
| 3,921,748 | 11/1975 | Dunn | 60/403 UX |

*Primary Examiner*—Edgar W. Geoghegan
*Attorney, Agent, or Firm*—August E. Roehrig, Jr.; Harvey W. Rockwell; Robert A. Brown

[57] ABSTRACT

An electric control circuit for use in the ignition system of a vehicle having a vehicle battery powered auxiliary steering system which is energized upon engine failure or shutdown during vehicle operation. The ignition circuit disconnects the auxiliary steering system from the vehicle battery during heating of the pre-start intake air and during starting of the engine to eliminate unnecessary drain on the vehicle battery.

8 Claims, 1 Drawing Figure

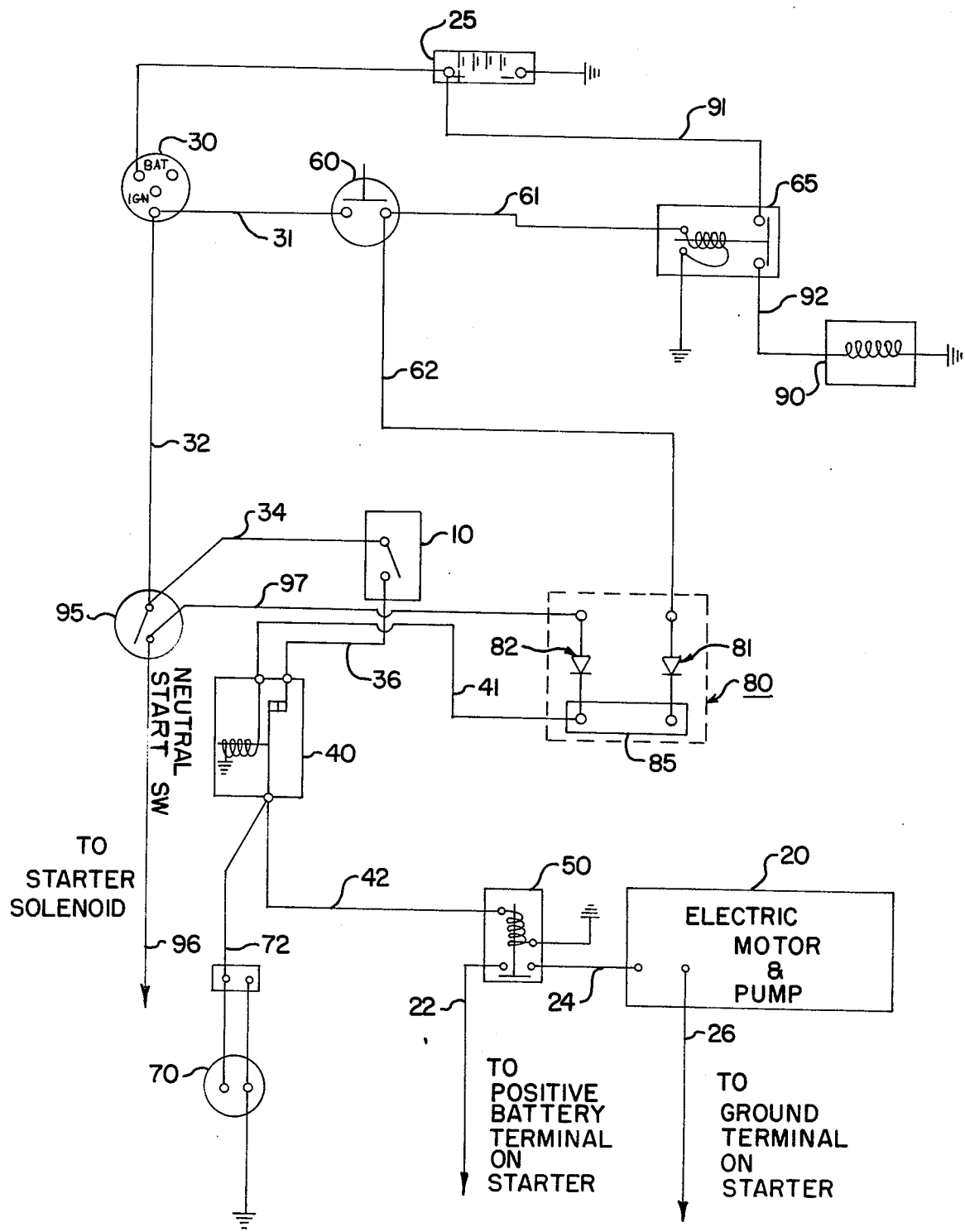

ENGINE AIR HEATER AND STARTING CIRCUITS TO BY-PASS AUXILIARY STEERING CIRCUIT

BACKGROUND OF THE INVENTION

This invention relates in general to vehicle ignition systems and, in particular, to ignition systems for vehicles having an air heater element for heating pre-start combustion air prior to starting the vehicle engine and having a vehicle battery powered auxiliary or emergency steering system which is actuated upon engine failure during operation of the vehicle.

More specifically, but without restriction to the particular use which is shown or described, this invention relates to a vehicle ignition circuit which automatically electrically isolates an auxiliary steering system from the vehicle battery upon energization of an air heater element for heating pre-start combustion air prior to engine starting to thereby eliminate unnecessary power drain on the vehicle battery.

In the operation of large vehicles such as those utilized in the construction machinery industry, due to the size of the vehicles and the functions they perform hydraulics are utilized to control steering and braking of the vehicle as well as the functions of various auxiliary equipment. While power steering and brake systems are required on such vehicles due to the vehicle size and weight, they can present a safety hazard in the event of engine failure or failure of the engine drive hydraulic pump such as occurs when the engine stalls or fails during vehicle operation. Therefore, it is necessary to have an auxiliary or emergency hydraulic pump to supply pressurized hydraulic fluid to control vehicle braking and steering in order to safeguard the machine operator and others who may be in the area where the vehicle is operating.

The pressurized hydraulic fluid required for power steering and power braking is normally provided by an engine driven hydraulic pump which supplies the power steering and brake units, as well as operating the hydraulically powered auxiliary equipment utilized with the vehicle. However, when the vehicle engine stalls or stops during operation, the hydraulic pump supplying fluid to these components is no longer driven by the engine and, therefore, hydraulic fluid pressure is lost which results in the loss of power steering and brakes.

In order to eliminate this potential safety hazard, auxiliary or emergency hydraulic pumping systems are incorporated in such vehicles. Various auxiliary or emergency hydraulic pumping systems are disclosed in the prior art and such prior art systems generally are activated by the closing of a sensor valve in the hydraulic system. The sensor valves have electrical contacts which are held open by the flow or pressure of the hydraulic fluid during engine operation to electrically isolate the auxiliary or emergency system. When the vehicle engine stalls or a failure in the hydraulic system occurs, the sensor valve closes to electrically couple the auxiliary system to the vehicle battery. While such systems provide a safeguard to prevent accidents, the closure of the sensor valve due to the absence of hydraulic fluid pressure or flow creates an unnecessary drain on the vehicle battery by not automatically electrically isolating the auxiliary system during engine start-up when the auxiliary system is not needed and maximum electrical power is required.

One system overcoming this problem and utilizing an electrically driven motor and pump powered by the vehicle battery to provide high-pressure hydraulic fluid to the vehicle brake and steering system in the event the vehicle engine or the engine-driven hydraulic pump fails or is inoperative is disclosed in co-pending application Ser. No. 751,378, filed Dec. 17, 1976, now U.S. Pat. No. 4,079,806, under the title "VEHICLE STARTING CIRCUIT TO BY-PASS AUXILIARY STEERING SYSTEMS", of which I am a co-inventor. In the system disclosed in this co-pending application, the electric motor driven hydraulic pump is automatically energized to provide pressurized hydraulic fluid to the steering and brake mechanism upon the occurrence of an emergency condition such as the failure of the engine during operation. The system disclosed and claimed therein automatically electrically isolates the vehicle battery powered hydraulic pump when starting the vehicle in order to eliminate an unnecessary drain on the vehicle battery.

As is well known to those in the construction machinery or earthmoving equipment field, it is sometimes desirable or necessary to heat the intake air used for the vehicle engine prior to attempting to start the vehicle. Since such heating occurs prior to attempting to start the vehicle engine, it is not necessary that the auxiliary or emergency hydraulic pump unit be energized when the intake air is being heated by the air heater element. Therefore, it is desirable that the vehicle battery powered electrical motor and pump unit also be automatically electrically isolated during heating of the pre-start combustion air to prevent another unnecessary power drain on the vehicle batteries. Since there is no hydraulic fluid pressure or flow in the hydraulic system at this time, the sensors for the auxiliary or emergency hydraulic system will be closed and the auxiliary system will be coupled into the vehicle ignition circuit unnecessarily draining the vehicle battery.

In order to eliminate imposing this unnecessary drain on the vehicle battery when the intake air is being heated, it is desirable to isolate the electrically driven motor and pump unit from the vehicle battery not only during engine startup, but during heating of the pre-start intake air.

SUMMARY OF THE INVENTION

It is, therefore, an object of this invention to improve the coupling of auxiliary or emergency hydraulic pumping systems to a vehicle ignition system to automatically electrically isolate such auxiliary systems from the vehicle battery during heating of engine intake pre-start air.

Another object of this invention is to automatically electrically isolate an auxiliary or emergency hydraulic pumping system during heating of engine intake air prior to attempting to start the vehicle engine and during engine startup.

These and other objects are attained in accordance with the present invention wherein there is provided an electrical circuit for use in the ignition system of a vehicle having an auxiliary battery powered hydraulic system energized upon engine failure or shutdown during vehicle operation. The electrical circuit automatically disconnects the auxiliary system from the vehicle battery during heating of the engine's pre-start intake air and during engine starting.

DESCRIPTION OF THE DRAWINGS

Further objects of this invention, together with additional features contributing thereto and advantages accruing therefrom, will be apparent from the following description of a preferred embodiment of the invention described with reference to the accompanying drawing wherein there is shown an electrical scehmatic diagram of a portion of a vehicle ignition system to illustrate the manner in which an auxiliary electrically powered motor and hydraulic pump are coupled into the vehicle ignition system to be energized upon the failure of the vehicle engine or engine driven hydraulic system during vehicle operation and are automatically electrically isolated from the vehicle system during heat of the pre-start intake air and during vehicle starting.

DESCRIPTION OF A PREFERRED EMBODIMENT

In construction machinery such as earthmoving vehicles, for example, a main hydraulic pump is used to provide pressurized hydraulic fluid for steering and braking of the vehicle and a second hydraulic pump is used for supplying pressurized hydraulic fluid for auxiliary equipment used with the vehicle such as dozer blades or loading buckets. Both of these hydraulic pumps are driven by the vehicle engine and are connected to a hydraulic fluid reservoir and a suitable demand valve which controls the flow of hydraulic fluid to provide priority to the steering and braking system over the auxiliary equipment to insure that sufficient pressurized hydraulic fluid is provided for steering and braking purposes at all times.

In order to monitor the operation of the engine-driven hydraulic pumps, a sensor is coupled between the engine-powered hydraulic pumps and the demand valves. As hydraulic fluid is pumped from the main hydraulic pump through the sensor valve and the demand valve, the sensor will monitor the flow of hydraulic fluid to insure that a sufficient or suitable amount is provided. As is well known such valves may be of the type having a set of electrical contacts associated therewith that are responsive to either the pressure in the hydraulic system or flow of hydraulic fluid.

As long as the vehicle engine is in operation, the engine-driven hydraulic pump supplies sufficient pressurized hydraulic fluid flow through the sensor valve to maintain the associated electrical contacts open thereby isolating the auxiliary hydraulic pumping system from operation. In the event the vehicle engine fails, or for any other reason the main hydraulic pump does not function to provide sufficient pressurized hydraulic fluid to the sensor valve, the valve will close its associated electrical contacts which are illustrated in the drawing as a pair of switch contacts 10. Closing of the switch contacts 10 will energize an emergency or auxiliary electrically powered motor and pump 20 to provide sufficient pressurized hydraulic fluid for steering and braking. The auxiliary or emergency motor and pump 20 is coupled to a reservoir, demand valve and sensor valve (not shown) in a manner known to those skilled in the art to insure that sufficient hydraulic fluid is provided to the steering and braking systems when the electric motor and pump 20 are actuated.

In the event of a malfunction of the main steering pump or engine failure, the normally open electrical contacts of the sensor valve 10 will be closed due to the decrease in the pressure or flow rate of the hydraulic fluid. Closing of the contacts of the switch 10 completes a circuit from the vehicle battery 25 through a vehicle key switch 30, conductors 32, 34 and 36, normally closed contacts of a cut-out relay 40, conductor 42 and through a coil of a relay 50 to ground. At the same time a warning light and/or buzzer 70 is energized through conductor 72 to provide a warning signal to the machine operator that the engine has stalled and/or the main steering pump is inoperative.

Energizing the coil of the relay 50 closes its normally open contacts to complete a circuit coupling the electric motor and pump 20 to the vehicle battery through leads 22, 24 and 26. The electric motor and pump 20 is thereby energized to pump hydraulic fluid from the reservoir through the sensor valve to the demand valve for delivery to the steering valve of the vehicle. While a preferred embodiment of this invention which is disclosed herein utilizes relays to accomplish the desired function, solid-state electronics, such as transistors, could be substituted for circuit components through proper biasing known to those skilled in the art.

As previously discussed, the electrical contacts 10 associated with the sensor valve are closed whenever there is an insufficient flow of hydraulic fluid through the sensor valve. When the vehicle engine has been shut down and during preparation for starting such as heating pre-start intake air and during engine startup, the absence of sufficient hydraulic fluid flowing through the sensor valve would be interpreted as an engine or main hydraulic pump failure. Therefore, the electric motor and pump 20 would be coupled into the vehicle ignition circuit providing an unnecessary drain of electrical power from the vehicle battery when heating the pre-start intake air and during engine startup.

In order to electrically isolate the vehicle battery powered auxiliary motor and pump 20 during heating of the pre-start intake air, the vehicle ignition circuit disclosed herein automatically opens the normally closed contacts of cutout relay 40 even though the electrical contacts 10 of the sensor valve are closed. Opening of the normally closed contacts of cutout relay 40 during heating of the pre-start intake air is effected through a diode assembly 80 coupled between the coil of the cutout relay 40 and one terminal of the normally open, spring-biased push switch 60 (actuated to effect energizing of an air heater 90 for heating of the pre-start intake air) and one terminal of a neutral start switch 95 (actuated when starting the vehicle engine).

When it is desired to heat the pre-start intake air, the vehicle key switch 30 is closed and the push switch 60, coupled to the vehicle ignition switch 30 by a conductor 31, is also closed to couple the coil of a magnetic switch 65 to the vehicle battery 25 through conductor 61. Such coupling of the coil of magnetic switch 65 closes the normally open contacts to provide current to the air heater element 90 through conductors 91 snd 92.

When the normally open contacts of push switch 60 are closed, the vehicle battery 25 is also coupled through the ignition switch 30, conductor 31, the closed contacts of push switch 60, and a conductor 62 to a diode 81 of the diode assembly 80. The diode 81 is coupled to a bus bar 85 of the diode assembly 80 and through a conductor 41 to the coil of cutout relay 40. In this manner when the push button switch 60 is closed to effect heating of the intake combustion air, current is supplied from the vehicle battery 25 to the coil of the cutout relay 40 thereby opening the normally closed relay contacts electrically isolating the electric motor and pump 20. A second diode 82, the function of which will be hereinafter described in detail, blocks current flow to the neutral start switch 95. When the push button switch 60 is released, the current flow through the coil of the magnetic switch 65 terminates thereby automatically opening the switch contacts to terminate current flow to the pre-start air heater element 90, and current flow through the diode 81 and bus bar 85 of the diode assembly 80 terminates permitting the contacts of the cutout relay 40 to reclose.

After the pre-start intake air has been heated, the vehicle starter motor is engaged. As is known to those skilled in the art, in order to start the vehicle engine the vehicle transmission must be placed in neutral. When the vehicle transmission is placed in neutral, a neutral start switch 95 is closed and the starter motor engaged.

Since the vehicle engine is not yet operating, the electrical contacts 10 associated with the hydraulic fluid sensor valve are closed as these contacts are at all such times, including during heating of the pre-start intake air. Closing of contacts 10 couples the electric motor and pump 20 to the vehicle battery providing an unnecessary drain on the vehicle battery. Therefore, when the contacts of the neutral start switch 95 are closed current is coupled from the vehicle battery 25 to the ignition switch 30, through conductor 32 and the closed contacts of the neutral start switch 95 and through conductor 97 to the diode 82 and bus bar 85 of the diode assembly 80. The coil of the cutout relay 40, which is coupled to the diode assembly 80 by a conductor 41, is energized opening the normally closed contacts thereof to thereby electrically isolate the electric motor and pump 20. The diode 81 blocks reverse current flow to the magnetic switch 65.

Thus, whenever the key switch 30 is closed, the electrical contacts 10 actuated by the sensor valve control coupling of the emergency electric motor and pump system 20 to insure that an emergency steering and braking system is provided at all times. However, when the pre-start intake air is being heated, actuation of push switch 60 completes a circuit to the coil of the cutout relay 40 to electrically isolate the emergency steering system 20 at that time. Similarly, when the vehicle transmission is placed in neutral for starting purposes, and the neutral start switch 95 is closed, current is coupled to the coil of the cutout relay 40 opening the contacts thereof to electrically isolate the emergency steering and braking system motor and pump 20 to also prevent unnecessary power drain on the vehicle battery 25.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention but that the invention will include all embodiments falling within the scope of the appended claims.

What is claimed is:

1. In a vehicle having a vehicle engine driven hydraulic pump for supplying hydraulic fluid to a vehicle steering system, a vehicle battery driven auxiliary hydraulic pump for supplying hydraulic fluid to the vehicle steering system upon a predetermined decrease in hydraulic fluid supplied from said vehicle engine driven pump, auxiliary pump actuating means for coupling the vehicle battery driven auxiliary hydraulic pump to the vehicle battery in response to the occurrence of a predetermined decrease in hydraulic fluid supplied from said vehicle engine driven pump, an air heater element for heating intake air prior to vehicle engine starting, and a vehicle ignition system including the auxiliary pump actuating means, a normally open neutral start switch the contacts of which are closed when starting the vehicle and a normally open heater switch for effecting energization of the air heater element for heating the pre-start engine intake air, the improvement comprising a relay having normally closed relay contacts coupling said vehicle battery driven auxiliary hydraulic pump to the vehicle battery in response to said auxiliary pump actuating means and having a relay winding coupled to said normally open heater switch to open said normally closed relay contacts upon the closing of said normally open heater switch to electrically isolate said vehicle battery driven auxiliary hydraulic pump from the vehicle battery when said heater switch contacts are closed.

2. The apparatus of claim 1 further including a relay having normally open contacts and having a winding coupled in series between said vehicle battery driven auxiliary hydraulic pump and said auxiliary pump actuating means to close said normally open contacts in response to said auxiliary pump actuating means for coupling said battery driven pump to the vehicle battery.

3. The apparatus of claim 1 further including warning means coupled into said vehicle ignition system and actuable in response to said auxiliary pump actuating means for providing a discernible signal to a vehicle operator upon coupling of said auxiliary hydraulic pump to the vehicle battery.

4. The apparatus of claim 1 wherein said auxiliary pump actuating means comprises a fluid operated switch responsive to the movement of hydraulic fluid therethrough.

5. The apparatus of claim 4 wherein said fluid operated switch includes switch contacts held normally open in response to the movement of hydraulic fluid.

6. The apparatus of claim 1 further including means coupling said relay winding to said normally open neutral start switch to automatically open said normally closed relay contacts upon the closing of said normally open neutral start switch to electrically isolate said vehicle battery driven auxiliary hydraulic pump from the vehicle battery when starting the vehicle engine.

7. The apparatus of claim 6 including a diode assembly electrically coupling said normally open heater switch and said normally open neutral start switch to said relay winding thereby passing current to said relay winding and blocking reverse current flow through said diodes.

8. The apparatus of claim 7 wherein said diode assembly includes at least two diodes coupled in parallel to a bus bar, said bus bar being coupled in series to said relay winding, and each of said diodes being mutually exclusively coupled in series to said normally open heater switch or said normally open neutral start switch.

* * * * *